(12) United States Patent
Goto et al.

(10) Patent No.: US 9,810,550 B2
(45) Date of Patent: Nov. 7, 2017

(54) POSITION DETECTION DEVICE

(71) Applicant: AMITEQ CO., LTD., Tokyo (JP)

(72) Inventors: Atsutoshi Goto, Tokyo (JP); Daisuke Goto, Tokyo (JP); Kazuya Sakamoto, Tokyo (JP); Shuichi Tanaka, Kanagawa (JP)

(73) Assignee: AMITEQ CO., LTD., Tokyo (JP)

( * ) Notice: Subject to any disclaimer, the term of this patent is extended or adjusted under 35 U.S.C. 154(b) by 375 days.

(21) Appl. No.: 14/400,676

(22) PCT Filed: May 13, 2013

(86) PCT No.: PCT/JP2013/063339
§ 371 (c)(1),
(2) Date: Nov. 12, 2014

(87) PCT Pub. No.: WO2013/172315
PCT Pub. Date: Nov. 21, 2013

(65) Prior Publication Data
US 2015/0130444 A1    May 14, 2015

(30) Foreign Application Priority Data
May 14, 2012   (JP) ................ 2012-111065

(51) Int. Cl.
*G01D 5/14*    (2006.01)
*G01D 5/22*    (2006.01)

(52) U.S. Cl.
CPC ............ *G01D 5/14* (2013.01); *G01D 5/2258* (2013.01)

(58) Field of Classification Search
CPC ..... B60W 2420/506; G01D 5/14; G01D 5/20; G01D 5/22; G01D 5/225; G01D 5/2258;
(Continued)

(56) References Cited

U.S. PATENT DOCUMENTS 4,651,130 A * 3/1987 Pennell ............. G01D 5/22
                                                    318/656
5,831,432 A * 11/1998 Mohri ............... G01R 33/022
                                                    324/249
(Continued)

FOREIGN PATENT DOCUMENTS

JP        8205502 A  *  8/1996
JP       H08205502      8/1996
(Continued)

OTHER PUBLICATIONS

Written Opinion and Supplemental Search Report in counterpart EP Appl. 13791274.7, dated Sep. 18, 2015.
(Continued)

*Primary Examiner* — Tung X Nguyen
*Assistant Examiner* — Robert P Alejnikov, Jr.
(74) *Attorney, Agent, or Firm* — Blank Rome LLP

(57) ABSTRACT

In a position detection device of a type that omits a secondary coil, various inconveniences arising from the use of a voltage-dividing resistance (fixed resistor) are eliminated. At least two pairs of coils are provided. A magnetism-responsive member are placed so as to effect relative displacement in relation to the coils, the relative position of the member in relation to the coils varies with a position of a detection object, and impedance of each coil is varied with the relative position. The impedance changes of two coils constituting each one of coil pairs present characteristics of mutually opposite phase characteristics. For each coil pair, the two coils constituting the pair are connected in series with each other, and from a connection point thereof, a voltage-divided output voltage according to the impedance of the two coils is taken out as a detection output signal for the pair.

4 Claims, 2 Drawing Sheets

(58) Field of Classification Search
CPC G06K 7/082; H05K 2201/086; Y10S 336/00; Y10S 505/87
USPC .................................................. 324/207.15
See application file for complete search history.

(56) References Cited

U.S. PATENT DOCUMENTS

| | | | | |
|---|---|---|---|---|
| 5,926,001 | A * | 7/1999 | Eguchi | G01B 7/144 318/647 |
| 2003/0090223 | A1 * | 5/2003 | Nishizawa | G01D 3/022 318/268 |
| 2014/0347075 | A1 * | 11/2014 | Goto | G01B 7/003 324/652 |
| 2016/0131503 | A1 * | 5/2016 | Goto | G01B 7/003 324/207.17 |

FOREIGN PATENT DOCUMENTS

| | | |
|---|---|---|
| JP | H08205502 A | 8/1996 |
| JP | H09210726 A | 8/1997 |
| JP | 2003153510 A | 5/2003 |
| JP | 2003207370 A | 7/2003 |
| JP | 4047947 B | 2/2008 |
| JP | 2011153863 A | 8/2011 |

OTHER PUBLICATIONS

Examination Report in counterpart EP Appl. 13791274.7, dated Jul. 29, 2016, 5-pgs.
International Search Report received in corresponding PCT Application No. PCT/JP2013/063339, dated Jun. 4, 2013.
First Office Action in counterpart Chinese Appl. 201380025415.8, dated Feb. 3, 2016.
Office Action in counterpart JP Appl. P2013-528445, dated Dec. 6, 2016, 4-pgs.
Office Action in counterpart JP Appl. P2013-528445, dated Jul. 7, 2017, 4-pgs.

* cited by examiner

POSITION DETECTION DEVICE

TECHNICAL FIELD

The present invention relates to a position detection device which includes a coil and a magnetic or electrically-conductive member movable relative to the coil and which are suitable for detection of a rotational position over a full rotation or a predetermined angular range or detection of a linear position. More particularly, the present invention relates to a position detection device which, in response to a position of a detection object, generates an AC output signal presenting amplitude function characteristics of a plurality of phases using only a primary coil excited by an AC signal.

BACKGROUND ART

Induction-type rotational position detection devices of the type which produce two-phase outputs (i.e., outputs of sine and cosine phases) in response to a single-phase exciting input are commonly known as "resolvers", and induction-type rotational position detection devices of the type which produce three-phase outputs (i.e., outputs of three phases shifted from each other by 120°) in response to a single-phase exciting input are commonly known as "synchros". In the resolvers in the most traditional form, a stator includes two-pole (sine and cosine poles) secondary windings that intersect each other at a 90° mechanical angle, and a rotor includes a primary winding. The resolvers of this type are not satisfactory in that they need a brush to electrically contact the primary winding of the rotor. There have also been known brush-less resolvers that require no such brush; that is, these brush-less resolvers include, in the rotor, a rotary transformer in place of the brush. However, because of the provision of the rotary transformer in the rotor, it is difficult to reduce the overall size of the devices and thus there are limitations to the downsizing of the brush-less resolvers. Further, the provision of the rotary transformer increases the number of the component parts, which also leads to an unavoidable increase in the manufacturing cost.

Also known in the art are rotational position detection devices of the non-contact/variable-reluctance type (known in the past by the trade name "microsyn"), where a stator includes primary and secondary windings disposed on a plurality of projecting poles and a rotor is formed of a magnetic body having a predetermined shape (such as an elliptical circular shape, an oval shape or a shape having a projection). In these rotational position detection devices (rotary-type position detection devices), a reluctance variation responding to a rotational position of the object to be detected is produced on the basis of variations in gaps between the stator's projecting poles and the rotor's magnetic body that occur in response to a changing rotational position of the object to be detected, so that an output signal corresponding to the reluctance variation is provided. Further, similar reluctance-based rotational position detection devices are also disclosed, for example, in Patent Literature 1, 2 and 3. As position detection techniques based on the detector output signal, there have been known both a phase-based scheme in which position detecting data corresponds to an electrical phase angle of the output signal and a voltage-based scheme in which position detecting data corresponds to a voltage level of the output signal. In the case where the phase-based scheme is employed, the individual primary windings disposed at different mechanical angles are excited by phase-shifted inputs, such as two-phase or three-phase exciting inputs, so as to generate a single-phase output signal having a different electrical angle corresponding to a current rotational position. Further, in the case where the voltage-based scheme is employed, the relationship between the primary and secondary windings is reversed from that in the phase-based scheme, and plural-phase outputs are produced in response to a single-phase exciting input in the same manner as in the resolvers.

Typically, the rotational position detection devices, such as the resolvers, which produce plural-phase outputs in response to a single-phase, are arranged to produce two-phase outputs, namely, sine-phase and cosine-phase outputs. To this end, in the conventional resolver-style rotational position detection devices of the non-contact/variable-reluctance type, the stator has at least four poles that are spaced apart from each other by a mechanical angle of 90°; specifically, if the first pole is set to a sine phase, the second pole 90° apart from the first pole is set to a cosine phase, the third pole 90° apart from the second pole is set to a minus sine phase and the fourth pole 90° apart from the third pole is set to a minus cosine phase. In such a case, to bring about a reluctance variation, corresponding to a rotation of the object to be detected, in each of the stator poles, the rotor is formed of a magnetic or electrically-conductive substance into an elliptical circular shape, oval shape or cyclic shape such as a gear shape. Primary and secondary windings are disposed on each of the stator poles so that reluctance in a magnetic circuit passing through the stator pole is changed in response to a variation in a gap between the stator pole and the rotator. The reluctance change causes a degree of magnetic coupling between the primary and secondary coils on each of the stator poles to vary in correspondence with a rotational position of the object to be detected, and thus an output signal corresponding to the rotational position is induced in each of the secondary winding, with the result that a peak amplitude characteristic in the output signal from each of the stator poles presents a cyclic function characteristic.

However, because the known resolver-style rotational position detection devices of non-contact/variable-reluctance type such as discussed above are based on primary-secondary induction by the provision of the primary and secondary coils, a number of coils are required; hence, there is a limit to reduce an overall size of the device as well as a manufacturing cost.

On the other hand, Patent Literatures 4, 5 and 6 disclose impedance measurement type position detection devices constructed to include only a primary coil as sensor coil and to omit a secondary coil. In such case, in the know position detection device, to take out a detection output voltage from the position detection device, a voltage-dividing resistance (fixed resistance) is connected in series with the primary coil, and a detection output voltage is taken out from a connection point (voltage-dividing point) between the resistance and the coil.

PRIOR ART LITERATURE

Patent Literature 1: Japanese Patent Application Laid-open Publication No. SHO-55-46862
Patent Literature 2: Japanese Patent Application Laid-open Publication No. SHO-55-70406
Patent Literature 3: Japanese Patent Application Laid-open Publication No. SHO-59-28603
Patent Literature 4: Japanese Patent Application Laid-open Publication No. 2009-162783

Patent Literature 5: Japanese Patent Application Laid-open Publication No. 2009-216718

Patent Literature 6: Japanese Patent Application Laid-open Publication No. 2010-271333

In the position detection device of a type without a secondary coil as disclosed in the Patent Literatures 4, 5, and 6, because the detection output voltage is taken out from the voltage-dividing resistance (fixed resistance) connected in series with the primary coil, an amount of electric current available for passing through the coil is limited by the fixed resistance, therefore an efficiency of variation in the impedance of the coil is degraded. Hence there is a problem that it is not possible to increase a dynamic range of the detection output voltage. Further, if a physical placement of the voltage-dividing resistance (fixed resistance) is close to a physical placement of the coil which is a detection element, the fixed resistance element which is an electric component will be affected directly by an ambience where a sensor device (the coil) is disposed. This is unfavorable to ensure reliability of components of the device. On the other hand, if a physical placement of the voltage-dividing resistance (fixed resistance) is separate from a physical displacement of the coil, i.e., a detection element, to dispose the voltage-dividing resistance on an apparatus side for detecting/controlling, an output line from the sensor device (the coil) which is connected to the voltage-dividing resistance (fixed resistance) can not be formed a twisted pair of wiring, thus there is a disadvantage that a noise cancellation effect may not attain. Furthermore, there is a problem that an unevenness of resistance values and/or an unevenness of temperature characteristics of each resistance (fixed resistance) incorporating into the sensor device as an individual component may negatively affect on the detection accuracy of the device.

SUMMARY OF INVENTION

It is therefore an object of the present invention to provide a position detection device of a type without a secondary coil, which can eliminate various inconveniences caused by use of a voltage-dividing resistance (fixed resistance).

A position detection device of the present invention comprises: a coil section including at least two pairs of coils to be excited by an AC signal, coils constituting each one of the pairs being disposed at predetermined intervals; a magnetism-responsive member movable relative to said coil section, a relative position of the magnetism-responsive member in relation to the coil section varying in accordance with a position of a detection object, the magnetism-responsive member being constructed to vary impedance of each coil according to the relative position, impedance variations of two coils constituting each one of pairs presenting characteristics of mutually opposite phase characteristics; and a circuitry that constructs, for each of the pairs, a serial connection circuit of coils in which the two coils constituting the pair are connected in series with each other, supplies the AC signal to the serial connection circuit of coils for each of the pairs, and takes out, for each of the pairs, a voltage-divided output voltage responsive to the impedance of the two coils in the pair from a connection point of the two coils in the serial connection circuit for the pair as a detection output signal for the pair.

According to the present invention, since respective impedance variations of the two coils, constituting one pair, to be excited by an AC signal present the characteristics of mutually opposite characteristics; and the two coils constituting the pair are connected in series with each other so as to be taken out the voltage-divided output voltage responsive to the respective impedance of the two coils from the connection point of the pair of coils as the detection output signal; it is possible to increase a dynamic range of the detection output voltage. Further, since there is no need to incorporate a fixed resistance element, i.e., an electric component, into a sensor/coil section, a physical placement ambience of the sensor/coil section never affect a reliability of circuitry components. Further, it is possible to form, for each coil constituting one coil pair, a twisted pair with a primary wiring, thus it is possible to attain a noise cancellation effect.

DESCRIPTION OF EMBODIMENTS

Figure 1:
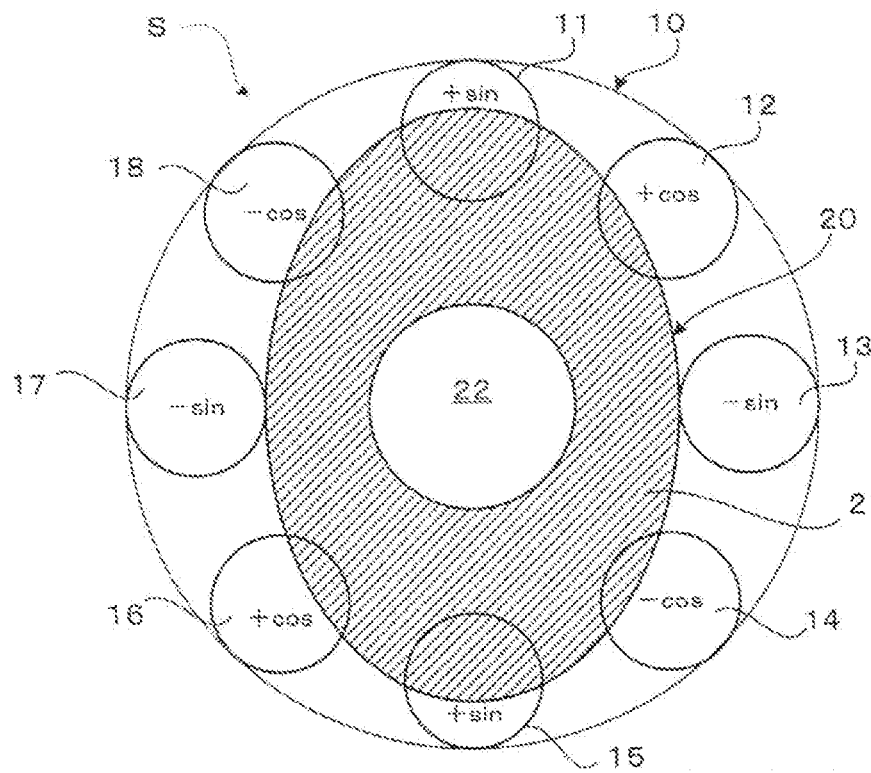
FIG. 1 is a schematic front view showing an example of coil arrangement in a position detection device according to an embodiment of the present invention.

FIG. 1 shows a schematic front view showing an example of a relation of a physical arrangement between a stator section 10 and a rotor section 20 in sensor section S of a rotational position detection device according to an embodiment of the present invention. The stator section 10 comprises a coil section fixedly provided therein, and the coil section includes eight coils 11 to 18 disposed at equal intervals (45° mechanical angular intervals) along a circumferential direction of the stator section 10. The rotor section 20 is constructed to rotationally move relative to the stator section 10 in response to displacement of the position of the detection object. The rotor section 20 is constructed of a magnetism-responsive member 21 of a predetermined shape, such as an elliptical disk shape, mounted on the rotation shaft 22 to which is applied rotational movement as a detection object. Although it is assumed, for convenience of description, that the magnetism-responsive member 21 is formed of magnetic material, such as iron.

As an example, the stator section 10 is disposed opposed to the rotor section 20 in a thrust direction. In this case, the individual coils 11 to 18 are disposed in such a manner that magnetic fluxes passing through the coils are oriented in the axial direction of the rotation shaft 22. As an example, each coil 11 to 18 is winded onto an iron core (magnetic substance core) not shown. A gap is formed between the end surfaces of an iron core (magnetic substance core) of the coils 11 to 18 and a surface of the magnetism-responsive member 21 of the rotor section 20, and thus, the rotor section 20 rotates relative to the stator section 10 in a non-contact fashion. Relative positions of the rotor section 20 and the stator section 10 are set so that the gap or distance between the rotor section 20 and the stator section 10 is maintained constant, via mechanism not shown. Because the magnetism-responsive member 21 of the rotor section 20 has the predetermined shape, such as an elliptical disk shape, the end surface area of the coils opposed to the magnetism-responsive member 21 via the gap varies in accordance with a rotational position of the magnetism-responsive member 21 of the rotor section 20. In response to such a variation in area between the rotor section 20 and the stator section 10 due to rotation of the rotor section 20, an amount of the magnetic fluxes passing through the individual coils varies, so that the inductance (impedance) of the individual coils 11 to 18 varies.

In another example of the arrangement of coils, as known to a person skilled in the art, the stator section 10 may be disposed in such a way to oppose to the rotor section 20 in a radial direction of the rotation shaft 22 so that the magnetic fluxes of the individual coils 11 to 18 are oriented in the radial direction. In this case, a gap or distance between the magnetism-responsive member 21 of the rotor section 20 and the end surfaces of the coils 11 to 18 varies in accordance with a rotational position of the magnetism-responsive member 21 and the variation of the gap or distance cause to vary an amount of the magnetic fluxes passing through the individual coils 11 to 18. In this way the inductance (impedance) of the individual coils 11 to 18 varies.

Because of the elliptical disk shape of the magnetism-responsive member 21 of the rotor section 20, the inductance (impedance) variation of the coils 11 to 18 occurs at a rate of two cycle per two rotation of the rotation shaft 22. By properly designing the material, shape and other suitable factors of the magnetism-responsive member 21 of the rotor section 20, the rotor section 20 can be designed properly so that a cyclic characteristic of the inductance (impedance) variation of the coils 11 to 18 presents an ideal or approximative triangular functional characteristic.

If the cyclic characteristic of the impedance variation of a certain one of the coils 11 is a plus (+) sine functional characteristic, the cyclic characteristics of the inductance variation of the other coils 12 to 18 sequentially arranged at the 45° mechanical angular intervals can be expressed as follows:

$A(\theta)=P_0+P \sin 2\theta$ (coil 11);
$B(\theta)=P_0+P \cos 2\theta$ (coil 12);
$C(\theta)=P_0-P \sin 2\theta$ (coil 13);
$D(\theta)=P_0-P \cos 2\theta$ (coil 14);
$E(\theta)=P_0+P \sin 2\theta$ (coil 15);
$F(\theta)=P_0+P \cos 2\theta$ (coil 16);
$G(\theta)=P_0-P \sin 2\theta$ (coil 17);
$H(\theta)=P_0-P \cos 2\theta$ (coil 18);

where $P_0$ indicates a center of the swing of the impedance variation, P indicates an amplitude of the swing. Because P may be regarded as "1" and omitted without involving any inconvenience, it will be omitted from the following description.

According to the present invention, the coils 11 to 18 in the coil section are combined to constitute a plurality of pairs each comprising two coils. The two coils constituting each one of the pairs are set such that respective impedance variations of the two coils present characteristics of mutually opposite phase characteristics in response to a position (rotational position) of the detection object. More specifically, the coil 11 of the +sine characteristic (plus sine phase) and the coil 13 of the −sine characteristic (minus sine phase) constitute one pair, while the coil 12 of the +cosine characteristic (plus cosine phase) and the coil 14 of the −cosine characteristic (minus cosine phase) constitute the other pair. Similarly, the coil 15 of the +sine characteristic (plus sine phase) and the coil 17 of the −sine characteristic (minus sine phase) constitute one pair, while the coil 16 of the +cosine characteristic (plus cosine phase) and the coil 18 of the −cosine characteristic (minus cosine phase) constitute the other pair.

Figure 2:
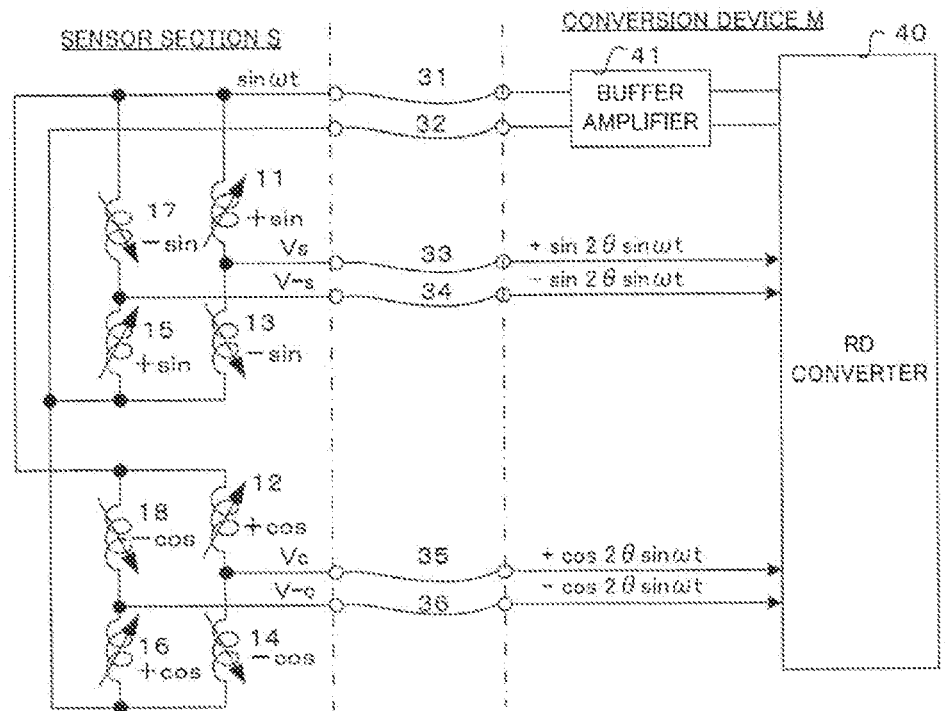
FIG. 2 is a circuit diagram showing an example of a circuit construction for detection according to the embodiment of the present invention.

As shown in FIG. 2, for each one of the coil pairs, two coils constituting the pair are connected in series with each other and these two coils are excited by constant current/constant voltage with a predetermined single-phase high frequency AC signal (referred to "sin ωt", for example) generated from an AC source. For each one of the coil pairs, a voltage-divided output voltage responsive to impedance of the two coils constituting the coil pair is taken out from a connection point of the two coils in the coil pair as a detection output signal (Vs, V-s, Vc or V-c) of the coil pair.

As for the pair of coils 11 and 13, for example, a voltage dividing ratio between the coils 11 and 13 is expressed by $A(\theta)/[A(\theta)+C(\theta)]$; and this voltage dividing ratio is a signal having a component of +sin 2θ as a variable factor. Namely, a voltage-divided AC output voltage obtained from the pair of coils 11 and 13 is a signal presenting an amplitude characteristic of a plus sine function (plus sine phase) responsive to the position (rotational position) θ of the detection object, and it may be equivalently expressed by +sin 2θ sin ωt. As for the pair of coils 15 and 17 which show the same sine characteristic, the coils 15 and 17 are connected in series with each other so as to show an inverse characteristic of the voltage-dividing circuit to the pair of coils 11 and 13. Namely, a voltage dividing ratio between the coils 15 and 17 is expressed by $G(\theta)/[E(\theta)+G(\theta)]$; and this voltage dividing ratio is a signal having a component of −sin 2θ as a variable factor. Accordingly, a voltage-divided AC output voltage obtained from the pair of coil 15 and 17 is a signal presenting an amplitude characteristic of a minus sine function (minus sine phase) responsive to the position (rotational position) θ of the detection object, and it may be equivalently expressed by −sin 2θ sin ωt.

Similarly, a voltage dividing ratio between the coils 12 and 14 is expressed by $B(\theta)/[B(\theta)+D(\theta)]$; and a voltage-divided AC output voltage obtained from the pair of coils 12 and 14 is a signal presenting an amplitude characteristic of a plus cosine function (plus cosine phase) responsive to the position (rotational position) θ of the detection object, and expressed as a signal equivalent to +cosin 2θ sin ωt. Also, as for the pair of coils 16 and 18 which show the same cosine characteristic, the coils 16 and 18 are connected in series with each other so as to show an inverse characteristic of the voltage-dividing circuit to the pair of coils 12 and 14; its voltage dividing ratio is expressed by $H(\theta)/[F(\theta)+H(\theta)]$, a voltage-divided AC output voltage obtained therefrom is a signal presenting an amplitude characteristic of a minus −cosine function (minus cosine phase) responsive to the position (rotational position) 0 of the detection object, and it may be equivalently expressed by −cosin 2θ sin ωt.

In this way, the respective detection output signals Vs, V-s, Vc, and V-c taken out from respective voltage-dividing output points of the respective coil pairs can be equivalently regarded as follows:

Vs=+sin 2θ sin ωt;
V-s=−sin 2θ sin ωt;
Vc=+cos 2θ sin ωt;
V-c=−cos 2θ sin ωt.

The construction of these detection output signals Vs, V-s, Vc, and V-c are similar to the construction of the output signals of a known rotational position detection device called "resolver". Accordingly, the detection output signals Vs, V-s, Vc, and V-c taken out from respective voltage-dividing output points of the respective coil pairs can be input to a RD (resolver-digital) converter which is known as a data converter for the resolver. Namely, a know RD converter can be applied to a position data converter for the position detection device according to the present invention. Needless to say, a data converter applied to the position detection device according to the present invention is not limited to the known RD converter but including any conversion devices based on other suitable measurement principles such as digital phase difference measuring devices, rectifier circuits or amplitude level extracting device.

In the example shown in FIG. 2, the coils 11 to 18 and the related wirings are only electric/electronic circuit components which are disposed at the sensor section S side (stator section 10 and rotor section 20). The sensor section S and the conversion device M are connected mutually via wirings 31 to 36 for connecting; thus it is permitted to separate a distance between sensor section S and the conversion device M. For example, the conversion device M includes the known RD converter 40, and the detection output signals Vs, V-s, Vc, and V-c which are output from sensor section S can be input to the RD converter 40 via the wirings 31 to 36. In turn, an exciting AC signal can be output from the RD converter 40 via a buffer amplifier 41, and can be supplied to the respective coil pairs of the sensor section S via wirings 31 and 32. As for each of the wirings 31 to 36, a twisted pair cable can be employed. For example, in the RD converter 40, the detection output signals of the sine phases Vs and V-s (+sin 2θ sin ωt and −sin 2θ sin ωt) are differentially amplified therebetween and the detection output signals of the cosine phase Vc, and V-c (+cosin 2θ sin ωt and −cosin 2θ sin ωt) are differentially amplified therebetween, and then according to known tracking method, a digital data presenting an angle component 2θ included in an amplitude component thereof can be produced based on the differentially amplified detection output signals sin 2θ sin ωt and cosin 2θ sin ωt of the sine phase and the cosine phase. It should be noted that because the digital data taken out therefrom may be presenting an angle 2θ which is two times of an actual rotary angle θ of the detection object, a detection range of an absolute rotational position may be a range of a half-rotation (180°). The rotational position beyond the detection range of an absolute rotational position may be detected by a conventionally-known method such a method of counting the number of cycles occurring per half rotation or the like.

Figure 3:
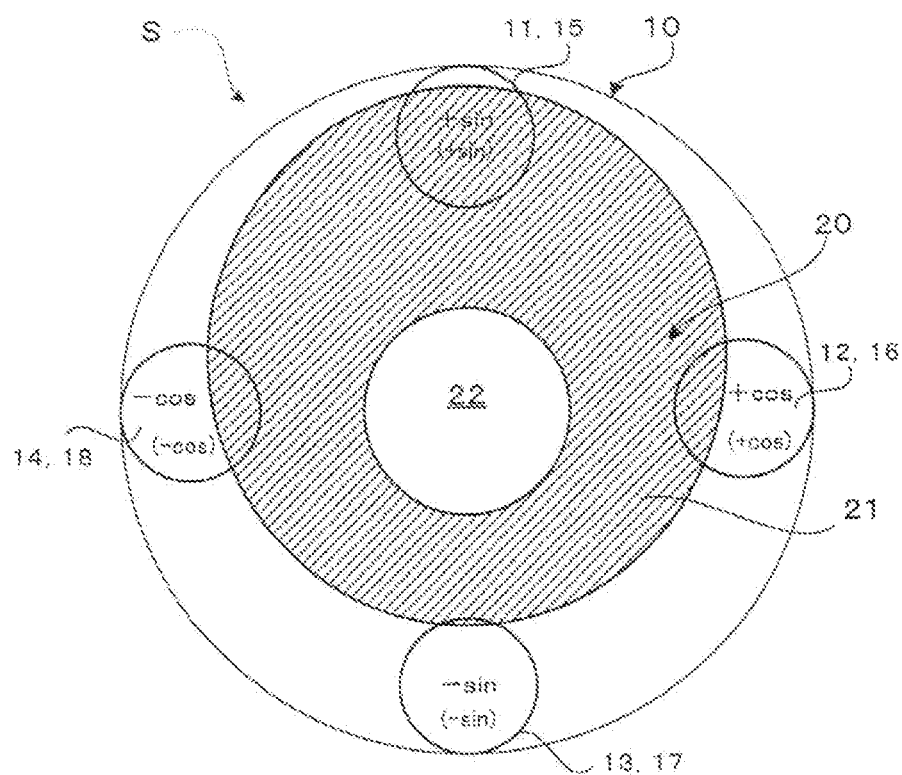
FIG. 3 is a schematic front view showing an example of coil arrangement in a position detection device according to another embodiment of the present invention.

The embodiment shown in FIG. 1 has eight coils (eight poles) arranged at the 45° mechanical angular intervals on the circumference, whereas the arrangement of coils and/or the number of the coils (poles) are not so limited, and any other design of coil arrangement may be employed. For example, FIG. 3 shows an example having four poles of coils arranged at the 90° mechanical angular intervals on the circumference within stator section 10. In the example of FIG. 3, two coils are displaced doubly per one pole (by bifilar winding, for example). Specifically, coils 11 and 15 of a plus sine phase are disposed at one plus sine pole, coils 12 and 16 of a plus cosine phase are disposed at one plus cosine pole, coils 13 and 17 of a minus sine phase are disposed at one minus sine pole, coils 14 and 18 of a minus cosine phase are disposed at one minus cosine pole. The magnetism-responsive member 21 of the rotor section 20 is formed in an eccentric disk shape, thus one cycle (one period) of inductance (impedance) variations occur in each of the coils 11 to 18 per one rotation of rotation shaft 22.

In the arrangement of coils shown in FIG. 3, the cyclic characteristics of the impedance variations of the coils 11 to 18 sequentially arranged at the 90° mechanical angular intervals can be expressed as follows:

$A(\theta) = P_0 + P \sin\theta$ (coil 11);
$B(\theta) = P_0 + P \cos\theta$ (coil 12);
$C(\theta) = P_0 - P \sin\theta$ (coil 13);
$D(\theta) = P_0 - P \cos\theta$ (coil 14);
$E(\theta) = P_0 + P \sin\theta$ (coil 15);
$F(\theta) = P_0 + P \cos\theta$ (coil 16);
$G(\theta) = P_0 - P \sin\theta$ (coil 17);
$H(\theta) = P_0 - P \cos\theta$ (coil 18).

The connecting configuration of the respective two coils 11 to 18 constituting one pair in the arrangement of coils shown in FIG. 3, is similar to the connecting configuration shown in FIG. 2. However, respective detection output signals Vs, V-s, Vc, and V-c taken out from respective voltage-divided output points of the respective coil pairs 11, 13; 15, 17; 12, 14; and 16, 18 can be equivalently expressed as follows:

$Vs = +\sin\theta \sin\omega t$;
$V\text{-}s = -\sin\theta \sin\omega t$;
$Vc = +\cos\theta \sin\omega t$;
$V\text{-}c = -\cos\theta \sin\omega t$.

In the arrangement of coils shown in FIG. 3, one cycle of impedance variations in the respective coils 11 to 18 corresponding to a variation of the position θ of the detection object occurs per one rotation (rotation of 360° mechanical angular).

The arrangement of coils and/or the number of the coils (poles) is not limited to the aforementioned examples and may be designed such that desired N cycles (N periods) of inductance(impedance) variations per one rotation of rotation shaft 22 may occur in the respective coils 11 to 18.

Each of the coils 11 to 18 may be constructed in the form of a flat coil formed on a printed circuit board, rather than a wire-winding coil. The magnetism-responsive member 21 disposed on the rotor section 20 may be formed of non-magnetic and electrically conductive material such as copper, or a hybrid type combined the magnetic material and the non-magnetic and electrically conductive material, in place of the magnetic material. Note that the present invention is applicable to a linear position detection device, rather than a rotational position detection device.

Further, while the four pairs of coils 11, 13; 15, 17; 12, 14; and 16, 18 are used in the aforementioned embodiments, the present invention is not so limited. Alternatively, at least two pairs of coils may be provided in the detection device so as to generate at least the detection output signal Vs of the sine phase and the detection output signal Vc of the cosine phase.

Whereas the aforementioned embodiments show that each of the coils 11 to 18 is disposed (wound) at one place or point, the present invention is not so limited. Each of the coils 11 to 18 may be constructed in a form of distributed windings extended over a given area by a known distributed-winding method. It is known that it is easy to realize impedance variations having a desired sine characteristic or a desired cosine characteristic in each of the coils 11 to 18, according to such the known distributed winding method.

Further, whereas the aforementioned embodiments show that each of coils 11 to 18 were excited by a single-phase AC signal sin ωt, the present invention is not so limited. For example, it is possible to use a known multi-phase excitation method. In such a case, each of coils 11 to 18 may be excited by two-phase signals (sin ωt and cosin ωt) mutually shifted at the 90° phase angular, or by three-phase signals [sin ωt, sin(ωt-120°) and sin(ωt-240°)] mutually shifted at the 120° phase angular. For example, in the arrangement including two pairs of coils as shown in FIG. 3, it is possible to apply a excitation method which the one pair of coils 11 and 13 are excited by a sine-phase AC signal sin ωt, and the other pair of coils 12 and 14 are excited by a cosine-phase AC signal cosin ωt.

In summary, according to the present invention, since respective impedance variations of the two coils, constituting one pair, to be excited by an AC signal present the characteristics of mutually opposite characteristics; and the two coils constituting the pair are connected in series with each other so as to be taken out the voltage-divided output voltage responsive to the respective impedance of the two coils from the connection point of the pair of coils as the detection output signal; it is possible to increase a dynamic range of the detection output voltage. Further since there is no need to incorporate a fixed resistance element, i.e., an electric component, into the sensor device, a physical placement ambience of the sensor device never affect the reliability of circuitry components. Further, it is possible to form, for each coil constituting one coil pair, a twisted pair of output wirings, thus it is possible to attain a noise cancellation effect.

What is claimed is:

1. A position detection device comprising:
   a coil section including at least two pairs of coils to be excited by an AC signal, coils constituting each one of the pairs being disposed at predetermined intervals;
   a magnetism-responsive member movable relative to said coil section, a relative position of the magnetism-responsive member in relation to the coil section varying in accordance with a position of a detection object, the magnetism-responsive member being constructed to vary impedance of each coil according to the relative position, impedance variations of two coils constituting each one of pairs presenting characteristics of mutually opposite phase characteristics; and
   a circuitry that constructs, for each of the pairs, a serial connection circuit of coils in which the two coils constituting the pair are connected in series with each other, supplies the AC signal to the serial connection circuit of coils for each of the pairs, and takes out, for each of the pairs, a voltage-divided output voltage responsive to the impedance of the two coils in the pair from a connection point of the two coils in the serial connection circuit for the pair as a detection output signal for the pair,
   wherein the detection output signal of a first pair of the at least two pairs of coils represents an amplitude characteristic of a plus sine phase to the position of the detection object; the detection output signal of a second pair of the at least two pairs of coils represents an amplitude characteristic of a minus sine phase to the position of the detection object; the detection output signal of a third pair of the at least two pairs of coils represents an amplitude characteristic of a plus cosine phase to the position of the detection object; and the detection output signal of a fourth pair of the at least two pairs of coils represents an amplitude characteristic of a minus cosine phase to the position of the detection object.

2. The position detection device as claimed in claim 1, further comprising: a stator section; and a rotor section rotating in response to rotational displacement of the position of the detection object, wherein said magnetism-responsive member is provided on the rotor section, and the coil section is provided on the rotor stator section.

3. The position detection device as claimed in claim 2, wherein the detection output signal of each coil pair are transmitted via twisted pair cables.

4. The position detection device as claimed in claim 1, wherein the detection output signal of each coil pair are transmitted via twisted pair cables.

* * * * *